April 5, 1955
C. C. UTZ
2,705,635
TORSION BAR SUSPENSION
Filed March 8, 1951
2 Sheets-Sheet 1
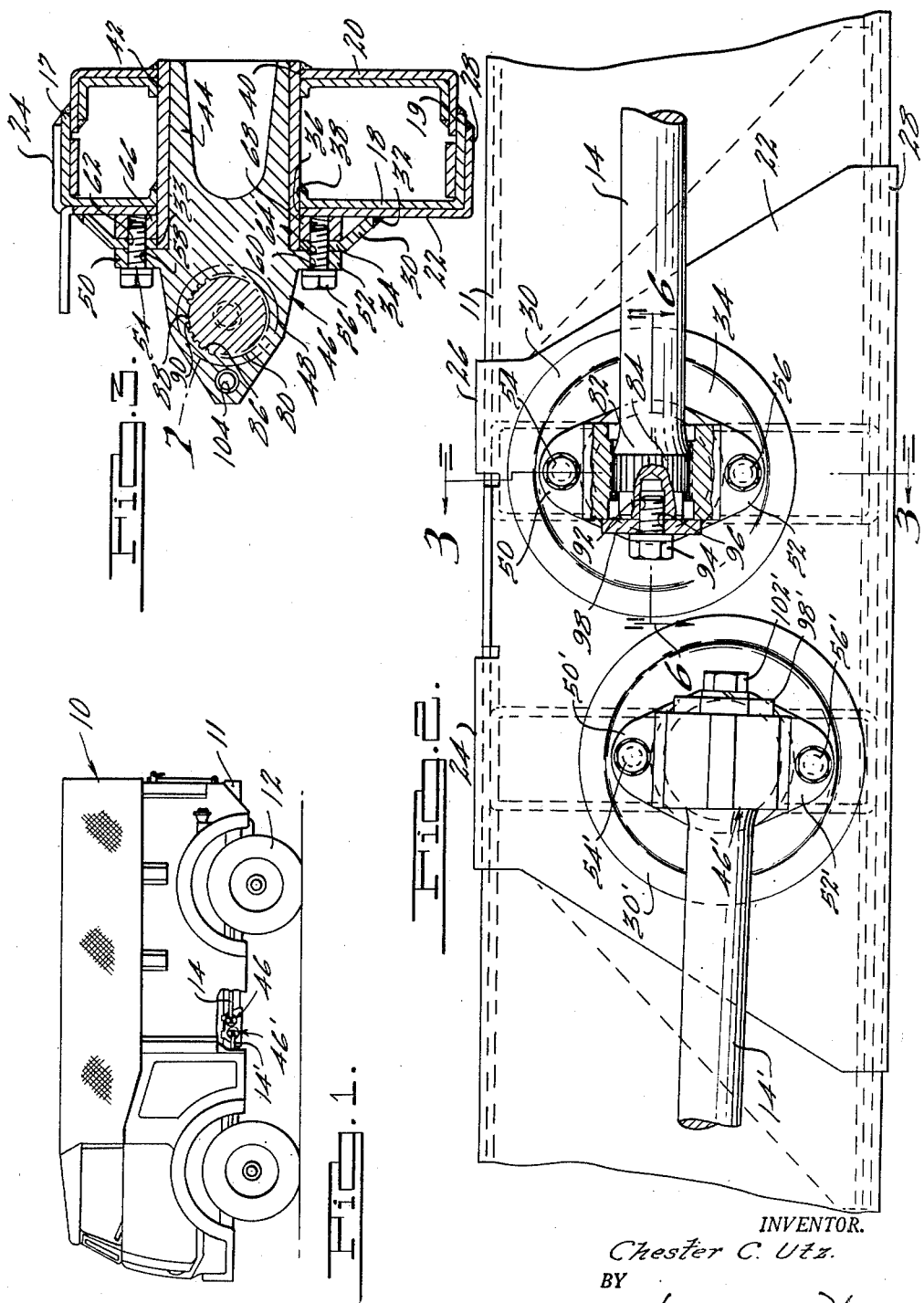
INVENTOR.
Chester C. Utz.
BY
Harness and Harris
ATTORNEYS.

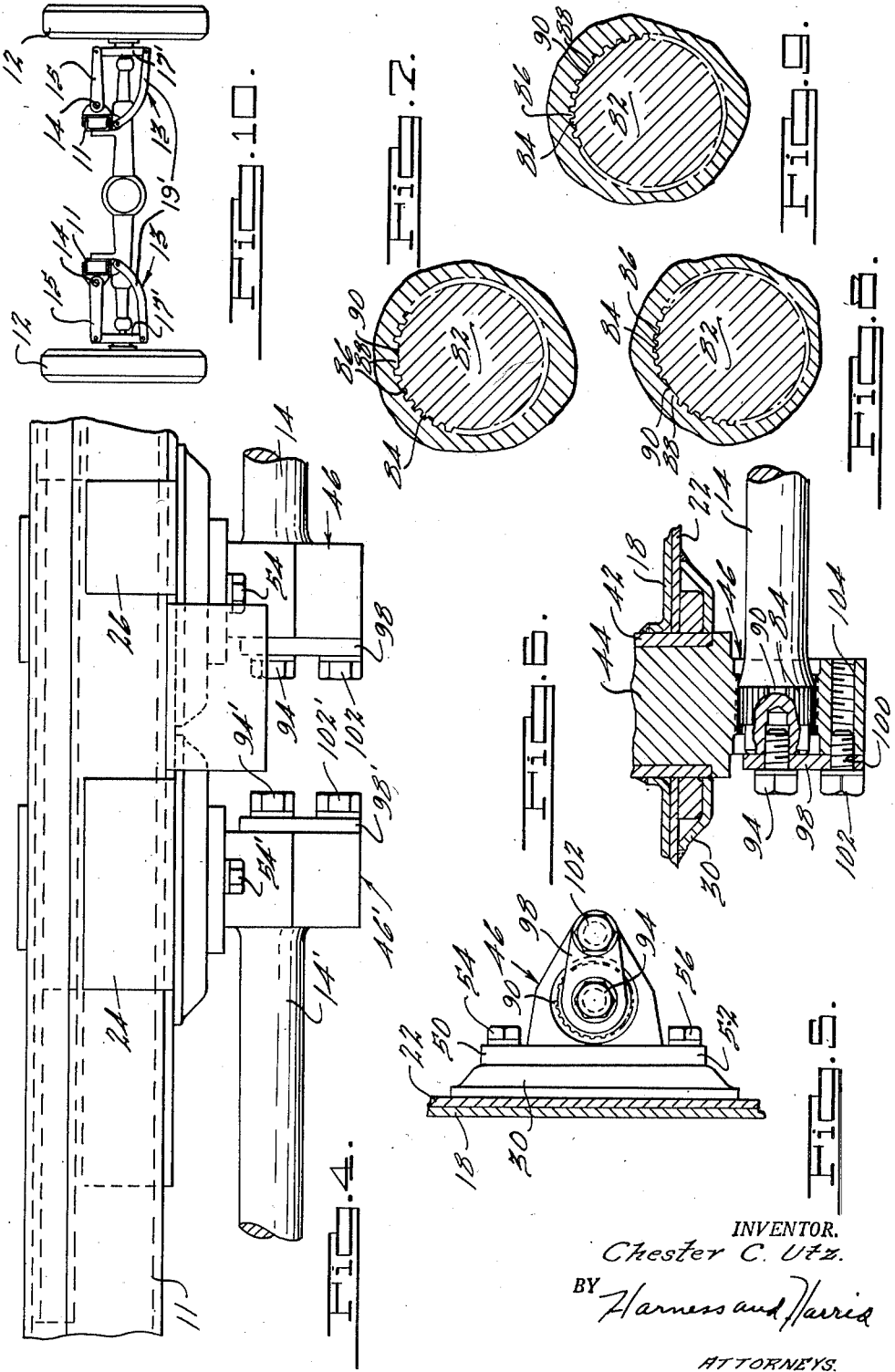

United States Patent Office 2,705,635
Patented Apr. 5, 1955

2,705,635

TORSION BAR SUSPENSION

Chester C. Utz, Detroit, Mich., assignor to Chrysler Corporation, Highland Park, Mich., a corporation of Delaware Application March 8, 1951, Serial No. 214,583

1 Claim. (Cl. 267—57)

The present invention relates generally to suspension systems and more particularly to an improved type of anchoring mechanism.

A principal object of the invention is to provide a vehicle with an improved torsion bar anchoring mechanism which is characterized by sturdiness of construction as well as simplicity of design.

Another object of my invention is to provide an improved torsion bar anchoring mechanism which is easily as well as economically manufactured.

A further object of my invention is to provide a torsion bar anchoring mechanism of the type which has interchangeable parts to effect an adjustability thereof.

Other objects and advantages will become more apparent from the following description of one embodiment of my invention, reference being had to the accompanying drawings in which:

Fig. 1 is a side elevational view of a vehicle having a portion thereof broken away to show the location of my invention.

Fig. 2 is a side elevational view of a portion of the frame shown in Fig. 1 illustrating my invention.

Fig. 3 is a sectional view taken on the line 3—3 of Fig. 2.

Fig. 4 is a plan view of the frame structure and torsion bar anchoring mechanisms shown in Fig. 2.

Fig. 5 is an end view of the torsion bar anchoring mechanism shown in Fig. 2.

Fig. 6 is a sectional view taken on the line 6—6 of Fig. 2.

Fig. 7 is an enlarged sectional view of the structure shown within the circle 7 in Fig. 3.

Fig. 8 is a modification of the structure shown in Fig. 7.

Fig. 9 is another modification of the structure shown in Fig. 7.

Fig. 10 is a rear elevational view of the truck illustrating the connection of the torsion bar to a control arm of the suspension system.

In Fig. 1 there is shown a truck 10 having a frame structure 11 and wheels 12 spacing the frame structure and body portion of the truck from the ground. The wheels 12 are provided with suspension structure, generally designated by the numeral 13, for connecting them to the truck 10. As more clearly seen in Fig. 10, the suspension structure includes an upper control arm 15 pivotally mounted at one end on the frame structure 11 while the other end is pivotally connected to the upper portion of a king pin assembly 17'. A lower control arm 19' is pivotally connected between the lower portion of the king pin assembly 17' and the frame structure 11. The assembly 17' is connected to the wheel 12. A torsion bar 14 has one end fixed to the upper control arm 15 at its pivotal connection to the frame structure and rotates about its longitudinal axis in response to rotation of the upper control arm 15. The torsion bar 14 provides spring means for resiliently mounting the wheel 12 relative to the frame structure. The opposite end of the torsion bar 14 from the upper control arm 15 is secured to the frame structure 11 by a torsion bar anchoring device generally designated by the numeral 16. Although there are two torsion bar anchoring devices shown in Fig. 2, the description will be limited to the device shown on the right side of Fig. 2 for the purpose of simplicity. The numerals applied to the right hand device as shown in Fig. 2 will be primed when applied to the corresponding elements shown on the left in Fig. 2.

Referring now more particularly to Figs. 2 to 4, the frame structure 11 is of a box-like cross sectional configuration having an outer rail 18 of channel-like configuration secured to and partially overlapping an inner rail 20. A re-inforcing plate 22 is secured to the outer rail 18 and is provided with upper flanges 24 and 26 and a lower flange 28 which are welded to upper and lower horizontal surfaces 17 and 19 of the outer rail 18, respectively. A dished member 30 has its open end 32 welded to the flat vertical surface of the plate 22 and is provided with an opening 33 therein. The opening 33 is located in the flat vertical portion 34 of the dished member 30 and is in registration with opening 36 in plate 22, opening 38 in the outer rail 18, and opening 40 in the inner rail 20. These registering openings receive and the edge portions of the openings are welded to a cylindrical sleeve 42.

The sleeve 42 receives a cylindrical portion 44 of a torsion bar anchoring member 46. The member 46 is also provided with a torsion bar receiving portion 48 which has vertically extending ears 50 and 52. The ears 50 and 52 are secured to the dished member 30 by bolts 54 and 56 which extend through openings 58 and 60 in the ears 50 and 52, respectively. The bolts 54 and 56 also extend through openings 62 and 64 in the dished member 30 and are retained in position by square nuts 66 and 68 disposed between the dished member 30 and the plate 22.

The receiving portion 48 of the anchoring member 46 is also provided with an internally splined cylindrical passage 80, the axis thereof extending longitudinally of the vehicle. The torsion bar 14 is provided with an externally splined portion 82 which is disposed within the passage 80 and which has teeth 84 which mesh with teeth 86 of the splined opening 80.

As more clearly shown in Fig. 3, the teeth 86 are disposed symmetrically within the splined passage 80 and completely line the passage except for the enlarged tooth 88. The enlarged tooth 88 is adapted to be received within the enlarged opening 90 disposed on the splined portion 82 of the torsion bar 14. The respective teeth within the passage 80 and on the torsion bar 14 mesh with each other and the enlarged tooth 88 is disposed within the enlarged opening 90 to thereby index the torsion bar 14 relative to the torsion bar anchoring device 46. It may be seen, therefore, that the amount of torsion to be applied to the torsion bar 14 may be predetermined by locating the enlarged tooth 88 within the passage 80 at the appropriate location.

In Figs. 7, 8, and 9, I have shown a typical example of how the torsion bar anchoring member 46 may serve to predetermine the amount of twist to be given to the torsion bar. Fig. 7 shows an enlarged view of the meshed teeth 84 and 86 of the torsion bar 14 and passage 80. Fig. 8 shows the enlarged tooth 88 disposed approximately 30° counterclockwise from the position shown in Fig. 7 while Fig. 9 shows the enlarged tooth 88 approximately 30° clockwise from the tooth shown in Fig. 7. It may be seen, therefore, that by merely removing the bolts 54 and 56 and withdrawing the anchoring member 46 from the sleeve 42, a new anchoring member may be replaced within the sleeve 42 to give one of the indexing structures shown in Figs. 8 or 9. By my improved structure, it is not necessary to supply the torsion bar anchoring device with adjustable means which may be expensive and critical to adjust and in many cases not necessary. By utilizing my improved device, a standard type of anchoring member 46 may be interchangeably placed within the sleeve 42 to afford a predetermined torsion on the torsion bar 14.

The torsion bar 14 at its end adjacent the teeth 84 is provided with a longitudinally extended threaded opening 92 which receives a bolt 94. The bolt 94 extends through an opening 96 in a plate 98 and hence into the threaded opening 92. The plate 98 is also provided with an opening 100 which receives a bolt 102, the latter being threaded into an opening 104 disposed in the receiving portion 48. The bolts 94 and 102 together with the plate 98 serve to hold the end of the torsion bar 14 within the receiving portion 48 and prevent any longitudinal movement of the torsion bar.

While I have illustrated and described but one embodiment of my invention, it is to be understood that such is for the purpose of illustration only, and it is contemplated that those skilled in the art may modify certain details without departing from the spirit or scope of the invention as defined in the claim appended hereto.

I claim:

In a vehicle having a frame structure provided with an opening therein, a device for anchoring the externally splined end of a torsion bar to said frame comprising an anchoring member having a first portion disposed within the opening in said frame and a second portion provided with a splined opening for receiving the aforementioned splined end of said torsion bar and holding the same against rotation about its longitudinal axis, means securing said anchoring member to said frame, and means preventing movement of said torsion bar in the direction of the length of said frame comprising a plate and first and second bolts, said first bolt securing said plate to said torsion bar and said second bolt securing said plate to the second portion of said anchoring member.

References Cited in the file of this patent

UNITED STATES PATENTS

| 2,283,971 | Chambers | May 26, 1942 |
| 2,335,546 | Sladky et al. | Nov. 30, 1943 |
| 2,457,583 | McCaslin | Dec. 28, 1948 |
| 2,606,758 | Collier | Aug. 12, 1952 |

FOREIGN PATENTS

| 220,146 | Great Britain | Aug. 14, 1924 |
| 458,337 | Great Britain | Dec. 17, 1936 |
| 556,241 | Great Britain | Sept. 27, 1943 |
| 626,779 | Great Britain | July 21, 1949 |
| 797,640 | France | Feb. 17, 1936 |
| 878,595 | France | Oct. 19, 1942 |